(12) United States Patent  
Lindemann

(10) Patent No.: US 9,103,386 B2  
(45) Date of Patent: Aug. 11, 2015

(54) REDUCED DRAG CLUTCH PLATE

(71) Applicants: Schaeffler Technologies GmbH & Co. KG, Herzogenaurach (DE); Schaeffler Group USA, Inc., Fort Mill, SC (US)

(72) Inventor: Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/275,959

(22) Filed: May 13, 2014

(65) Prior Publication Data

US 2014/0339045 A1 Nov. 20, 2014

Related U.S. Application Data

(60) Provisional application No. 61/823,400, filed on May 15, 2013.

(51) Int. Cl.  
*F16D 13/64* (2006.01)

(52) U.S. Cl.  
CPC .............. *F16D 13/64* (2013.01); *F16D 13/648* (2013.01)

(58) Field of Classification Search  
CPC . F16D 2013/642; F16D 13/68; F16D 13/648; F16D 69/0408; F16D 13/683  
USPC ............................ 92/107 C, 70.28, 85.4, 52.3  
See application file for complete search history.

(56) References Cited

U.S. PATENT DOCUMENTS

| 1,810,360 | A | * | 6/1931 | Loeffler | .................... 192/107 C |
| 4,113,078 | A | | 9/1978 | Maycock | |
| 4,762,214 | A | | 8/1988 | Hadaway | |
| 5,647,466 | A | * | 7/1997 | Umezawa | .................. 192/70.14 |
| 2011/0000758 | A1 | | 1/2011 | Steinberger et al. | |
| 2012/0145508 | A1 | | 6/2012 | Dziurda et al. | |

FOREIGN PATENT DOCUMENTS

EP    1227257 A2    7/2002  
JP    10122258 A    5/1998

OTHER PUBLICATIONS

International Search Report for PCT/US2014/037760, mailed Sep. 12, 2014 by the Korean Intellectual Property Office.

* cited by examiner

*Primary Examiner* — Rodney H Bonck  
*Assistant Examiner* — Lillian Nguyen  
(74) *Attorney, Agent, or Firm* — Kathryn A. Wamer; Kevin L. Parks

(57) ABSTRACT

A clutch plate includes an annular body and an integral resilient portion connected to the annular body by a first circumferentially extending tab. The annular body has inner and outer diameters and first and second parallel surfaces extending therebetween. The resilient portion has third and fourth parallel surfaces extending at respective acute angles to the first and second parallel surfaces. In some example embodiments, the clutch plate includes a wet friction material affixed to the first and third surfaces. In an example embodiment, the clutch plate has a wet friction material affixed to the second and fourth surfaces. In an example embodiment, the clutch plate has first and second circumferential slots respectively disposed radially inside and outside of the first circumferentially extending tab.

17 Claims, 3 Drawing Sheets

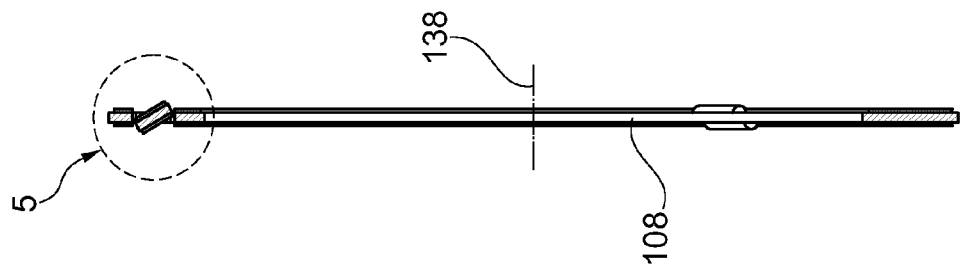
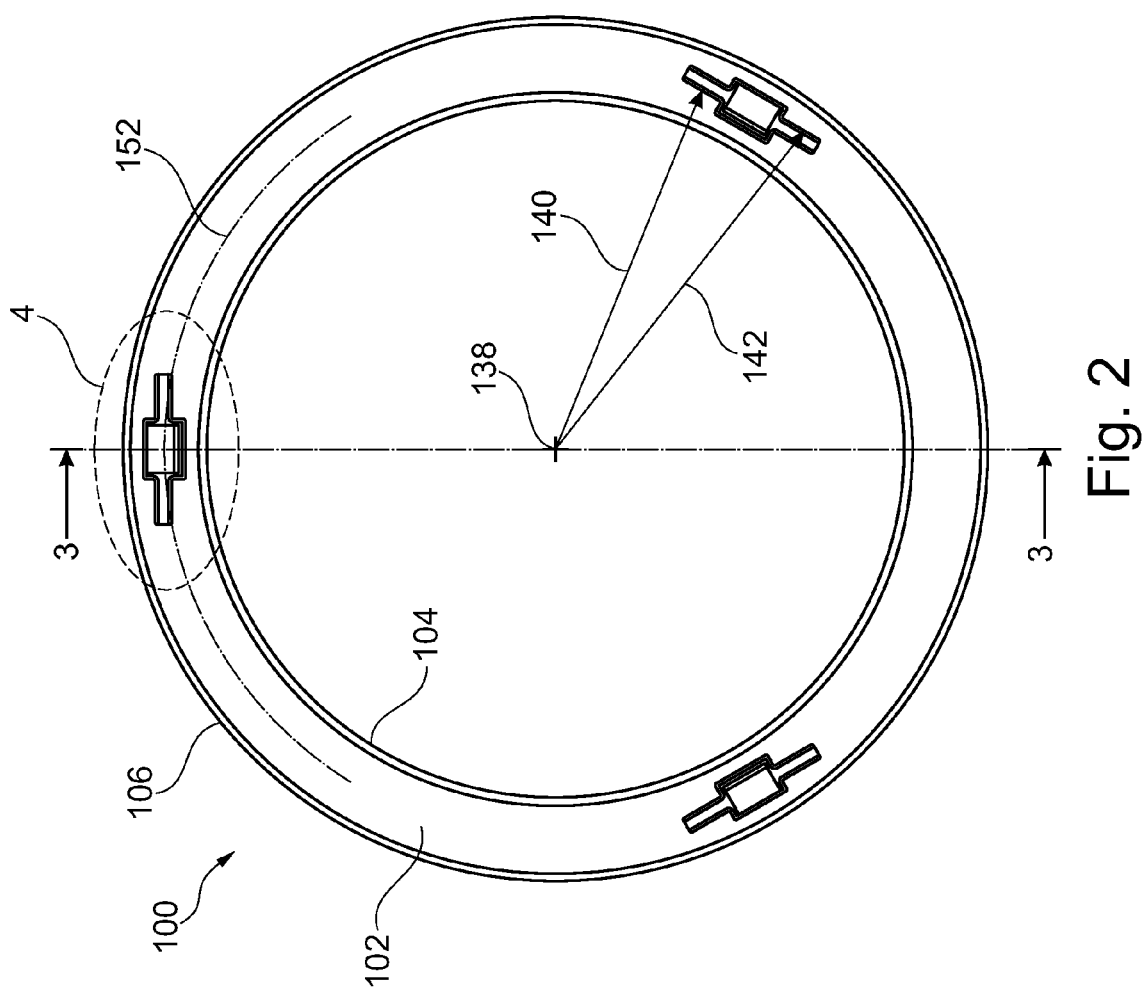

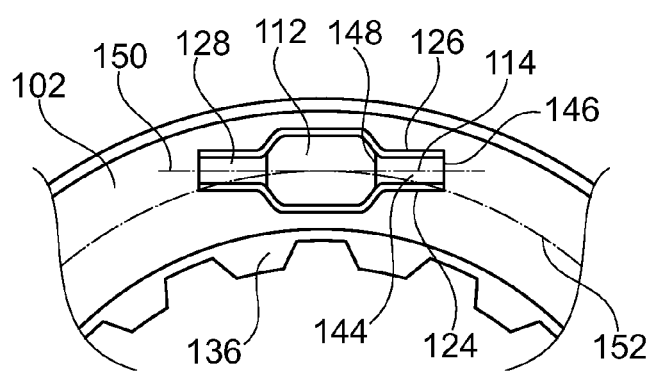
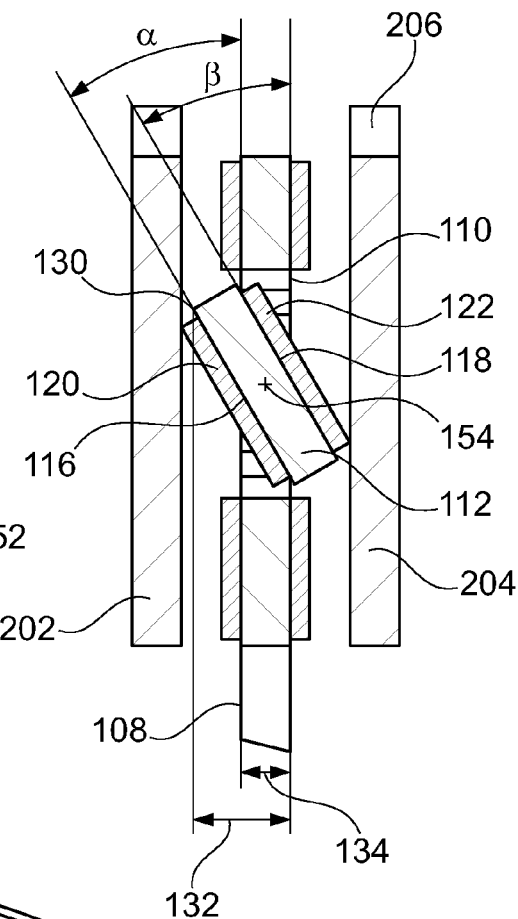
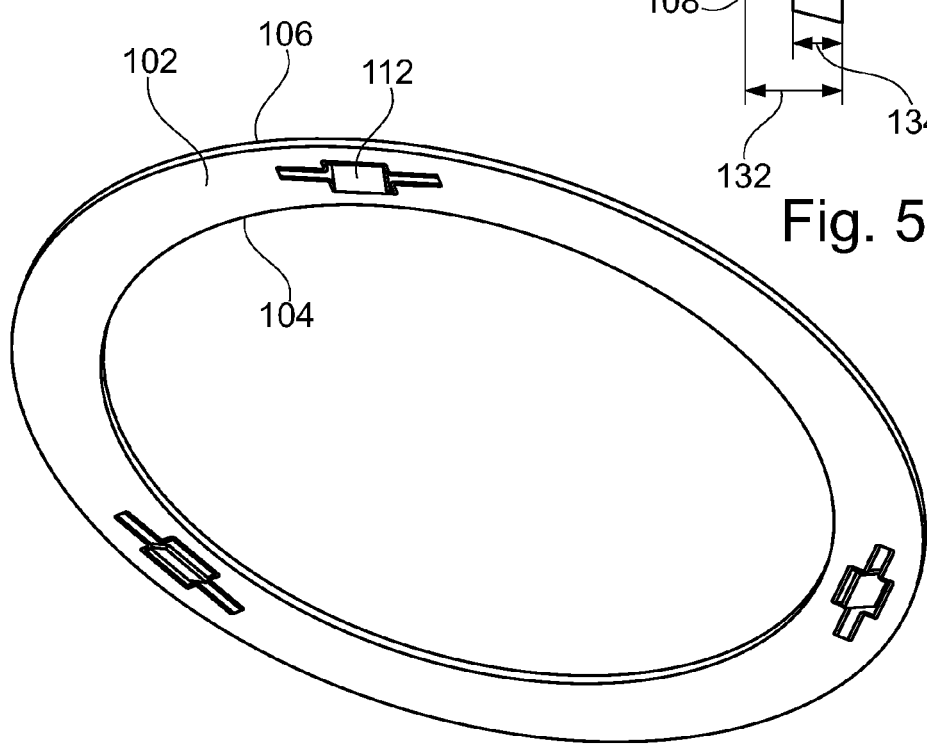

REDUCED DRAG CLUTCH PLATE

FIELD

The invention relates generally to a clutch plate, and more specifically to a clutch plate with an integral drag reducing element.

BACKGROUND

Clutch plates are known. One example is shown in commonly-assigned U.S. patent application publication No. 2011/0000758 for a reduced drag clutch plate including a resilient drag reducing element with a formed portion disposed radially between friction ring inner and outer circumferences.

BRIEF SUMMARY

Example aspects broadly comprise a clutch plate including an annular body and an integral resilient portion connected to the annular body by a first circumferentially extending tab. The annular body has inner and outer diameters and first and second parallel surfaces extending therebetween. The resilient portion has third and fourth parallel surfaces extending at respective acute angles to the first and second parallel surfaces. In some example embodiments, the clutch plate includes a wet friction material affixed to the first and third surfaces. In an example embodiment, the clutch plate has a wet friction material affixed to the second and fourth surfaces. In an example embodiment, the clutch plate has first and second circumferential slots respectively disposed radially inside and outside of the first circumferentially extending tab.

In some example embodiments, the clutch plate includes a second circumferentially extending tab. The resilient portion is disposed circumferentially between the first and second circumferentially extending tabs. In an example embodiment, the clutch plate has first and second circumferential slots respectively disposed radially inside and outside of the first circumferentially extending tab, and third and fourth circumferential slots respectively disposed radially inside and outside of the second circumferentially extending tab. In some example embodiments, the resilient portion third surface includes a edge, and an axial height of the edge is greater than a thickness of the annular body when measured from the second surface. In an example embodiment, the resilient portion is arranged to pivot with respect to the annular body such that the axial height of the edge is aligned with a plane formed by the first annular surface.

Other example aspects broadly comprise a clutch pack including first and second pressure plates and the clutch plate disposed therebetween. In an example embodiment, one of the first or second pressure plates, or the clutch plate, includes a radially outer spline for engaging a first clutch carrier, and the other of the first or second pressure plates, or the clutch plate, includes a radially inner spline for engaging a second clutch carrier. In an example embodiment, the resilient portion is arranged to be deflectable by the first and second pressure plates.

Other example aspects broadly comprise a clutch plate including a ring-shaped body portion, first and second slots, a connector portion, and a pivotable portion. The body portion has a first annular surface and includes a central axis extending orthogonal to the annular surface. The first slot extends from the first annular surface through the body portion in a circumferential direction at a varying radius when measured from the central axis. The second slot extends from the first annular surface through the body portion in a circumferential direction at a varying radius when measured from the central axis. The connector portion is disposed radially between the two slots at a first circumferential position. The pivotable portion is disposed radially between the two slots at a second circumferential position, offset from the first circumferential position, and including a planar surface extending at an acute angle with respect to the first annular surface.

In an example embodiment, the radii of the slots is closest together at the first circumferential position, and the radii of the slots is farthest apart at the second circumferential position. In an example embodiment, the clutch plate includes a wet friction material affixed to the the first annular surface and the pivotable portion planar surface. In an example embodiment, an inner circumference or an outer circumference of the annular portion includes a spline arranged for driving engagement with a clutch carrier.

Other example embodiment broadly comprise a clutch plate including first, second, and third surfaces. The first surface is a ring-shaped surface parallel to a first plane. The second surface is integral with the first surface and parallel to a second plane, non-parallel to the first plane. The third surface is a non-planar connector surface extending between the first and second surfaces. The third surface includes a first edge, shared with the first surface and parallel to the first plane, and a second edge, shared with the second surface and parallel to the second plane. In an example embodiment, the clutch plate includes a wet friction material affixed to the first and second surfaces. In an example embodiment, the clutch plate includes a fourth surface, parallel to and offset from the second surface by a first thickness and a central axis orthogonal to the first plane. The second and fourth surfaces are rotated relative to the first surface about an axis tangent to a circle with a center point on the central axis and passing through a point midway between the second and fourth surfaces.

BRIEF DESCRIPTION OF THE DRAWINGS

The nature and mode of operation of the present invention will now be more fully described in the following detailed description taken with the accompanying drawing figures, in which:

FIG. 2 is a front view of a clutch plate according to an example aspect;

FIG. 3 is a section view of the clutch plate of FIG. 2 taken generally along line 3-3 in FIG. 2;

FIG. 4 is a detail view of encircled region 4 in FIG. 2;

FIG. 5 is a detail view of encircled region 5 in FIG. 3;

FIG. 6 is a perspective view of the clutch plate of FIG. 2.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
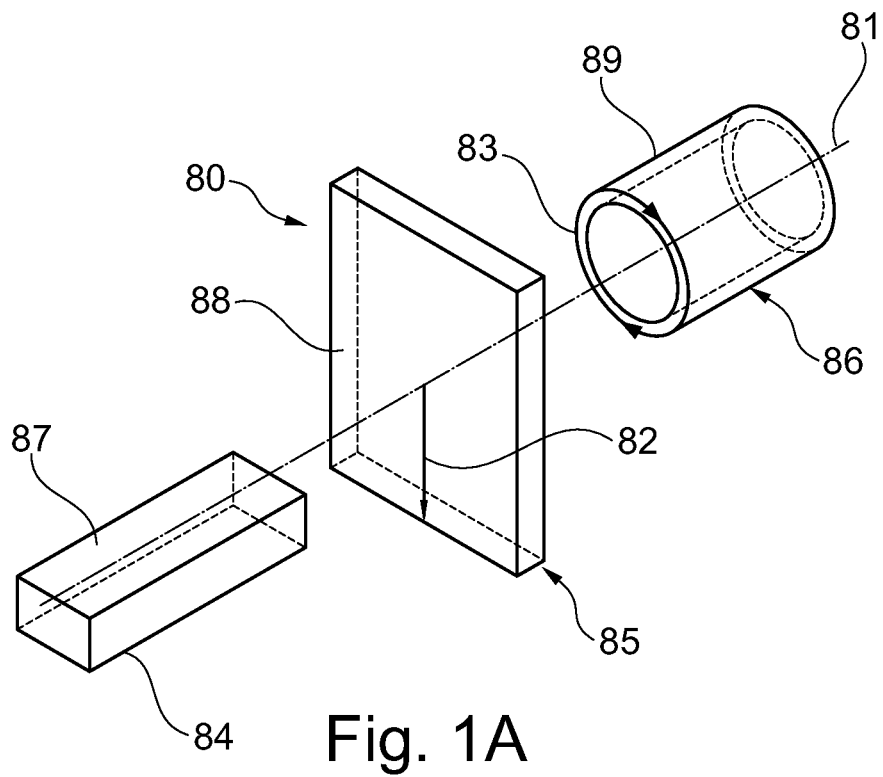
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
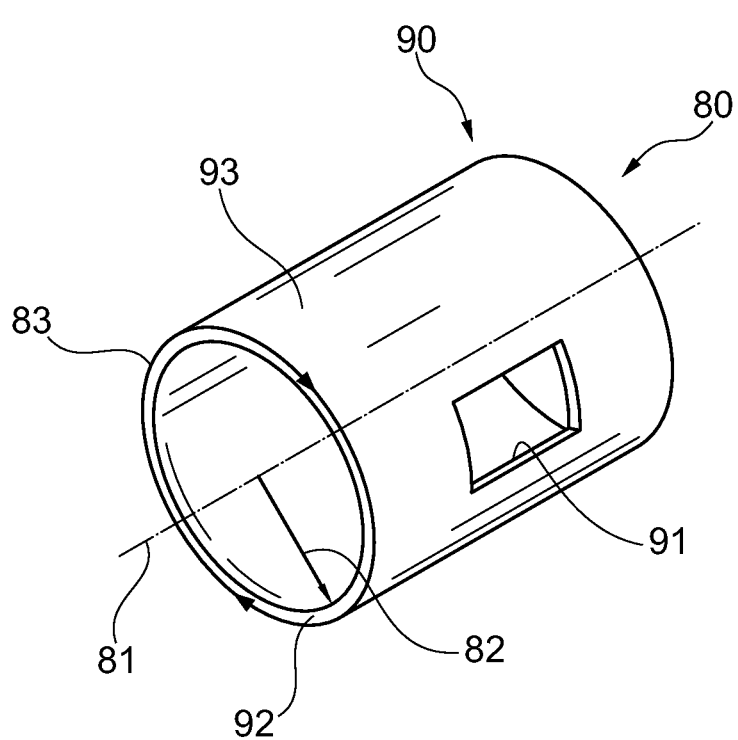
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIGS. 2-6. FIG. 2 is a front view of clutch plate 100 according to an example aspect. FIG. 3 is a section view of clutch plate 100 of FIG. 2 taken generally along line 3-3 in FIG. 2. FIG. 4 is a detail view of encircled region 4 in FIG. 2. FIG. 5 is a detail view of encircled region 5 in FIG. 3. FIG. 6 is a perspective view of clutch plate 100 of FIG. 2. Clutch plate 100 includes annular body, or ring-shaped body portion, 102 with inner and outer diameters, 104 and 106, respectively, and respective parallel surfaces 108 and 110, extending therebetween. Plate 100 also includes integral resilient portion 112 connected to annular body 102 by circumferentially extending tab 114. Integral means that the body and the resilient portion are formed from a same piece of material. Portion 112 includes respective parallel surfaces 116 and 118 extending at respective acute angles α and β to surfaces 108 and 110. Clutch plate 100 includes wet friction material 120 affixed to surfaces 108 and 116, and friction material 122 affixed to surfaces 110 and 118. Although plate 100 is shown with friction material affixed to both sides, other embodiments may include friction material on only one side or have no friction material at all.

Clutch plate 100 includes circumferential slots 124 and 126 respectively disposed radially inside and outside of circumferentially extending tab 114. Clutch plate 100 also includes circumferentially extending tab 128. As best seen in FIG. 4, resilient portion 112 is disposed circumferentially between circumferentially extending tabs 114 and 128. Surface 116 includes edge 130. Height 132 of edge 130 is greater than thickness 134 of body 102 measured from surface 110. Portion 112 is arranged to pivot with respect to annular body 102 such that axial height 132 of edge 130 is aligned with a plane formed by the annular surface 108. In other words, because portion 112 is formed of a same piece of material as body 102, portion 112 is pivotable to lie coplanar with the annular body such that the portion and the body form a flat surface.

As shown in FIG. 5, clutch pack 200 includes pressure plates 202 and 204, and clutch plate 100. Pressure plates 202 and 204 include radially outer spline 206 for engaging a clutch carrier (not shown) and clutch plate 100 includes radially inner spline 136 for engaging a clutch carrier (not shown). Portion 112 is arranged to be deflectable by the pressure plates 202 and 204. For example, portion 112 axially displaces the pressure plates away from the clutch plate to reduce viscous drag from an oil bath in which the clutch pack is installed when the pressure plates and the clutch plate are rotating at different speeds. But when the clutch is engaged and axial force is applied to the pressure plates to clamp the clutch plate, the resilient portion is easily deflected so that the pressure plates tightly clamp against the clutch plate friction material as in a conventional clutch plate.

Central axis 138 extends orthogonal to surface 108. Slot 124 extends from annular surface 108 through body portion 102 in a circumferential direction at varying radius 140 when measured from central axis 138. Slot 126 extends from annular surface 108 through body portion 102 in a circumferential direction at varying radius 142 when measured from central axis 138. Connector portion 114 is disposed radially between the two slots at a first circumferential position and pivotable portion 112 is disposed radially between the two slots at a second circumferential position, offset from the first circumferential position. Radial distances, or radii, 140 and 142 is closest together at the first circumferential position, and farthest apart at the second circumferential position. That is, a radial width of portion 114 is less than a radial width of pivotable portion 112.

Circumferentially extending tab 114 includes connector surface 144 with edge 146 shared with surface 108, and edge 148 shared with surface 116. Portion 112, and surfaces 116 and 118, are rotated relative to surface 108 about axis 150 tangent to circle 152 with a center point on central axis 138 and passing through point 152 midway between surfaces 116 and 118. Although plate 100 is shown with three pivotable portions 112, other numbers are possible. Generally, at least three portions 112 are preferred.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A clutch plate comprising:
an annular body with inner and outer diameters and first and second parallel surfaces extending therebetween;

an integral resilient portion connected to the annular body by a first circumferentially extending tab and including third and fourth parallel surfaces extending at respective acute angles to the first and second parallel surfaces; and, the resilient portion third surface includes an edge; and, an axial height of the edge is greater than a thickness of the annular body when measured from the second surface.

2. The clutch plate of claim 1 further comprising a wet friction material affixed to the first and third surfaces.

3. The clutch plate of claim 2 further comprising a wet friction material affixed to the second and fourth surfaces.

4. The clutch plate of claim 1 further comprising first and second circumferential slots respectively disposed radially inside and outside of the first circumferentially extending tab.

5. The clutch plate of claim 1 further comprising a second circumferentially extending tab, wherein the resilient portion is disposed circumferentially between the first and second circumferentially extending tabs.

6. The clutch plate of claim 5 further comprising:
first and second circumferential slots respectively disposed radially inside and outside of the first circumferentially extending tab; and,
third and fourth circumferential slots respectively disposed radially inside and outside of the second circumferentially extending tab.

7. The clutch plate of claim 1 wherein the resilient portion is arranged to pivot with respect to the annular body such that the axial height of the edge is aligned with a plane formed by the first parallel surface.

8. A clutch pack comprising:
first and second pressure plates; and,
the clutch plate of claim 1 disposed therebetween.

9. The clutch pack of claim 8 wherein:
one of the first or second pressure plates, or the clutch plate, includes a radially outer spline for engaging a first clutch carrier; and,
the other of the first or second pressure plates, or the clutch plate, includes a radially inner spline for engaging a second clutch carrier.

10. The clutch pack of claim 8 wherein the resilient portion is arranged to be deflectable by the first and second pressure plates.

11. A clutch plate comprising:
a ring-shaped body portion with a first annular surface and including a central axis extending orthogonal to the annular surface;
a first slot extending from the first annular surface through the body portion in a circumferential direction at a varying radius when measured from the central axis;
a second slot extending from the first annular surface through the body portion in a circumferential direction at a varying radius when measured from the central axis;
first and second connector portions disposed radially between the two slots at first and second circumferential positions; and,
a pivotable portion disposed radially between the two slots at a third circumferential position, disposed between the first and second circumferential positions, and including a planar surface extending at an acute angle with respect to the first annular surface.

12. The clutch plate of claim 11 wherein the radii of the slots is closest together at the first and second circumferential positions, and the radii of the slots is farthest apart at the third circumferential position.

13. The clutch plate of claim 11 further comprising a wet friction material affixed to the first annular surface and the pivotable portion planar surface.

14. The clutch plate of claim 11 wherein an inner circumference or an outer circumference of the annular portion includes a spline arranged for driving engagement with a clutch carrier.

15. A clutch plate comprising:
first and second, ring-shaped, surfaces, having a first thickness therebetween, parallel to a first plane and including a central axis orthogonal to the first plane;
a third surface, integral with the first surface and parallel to a second plane, non-parallel to the first plane; the third surface including a first edge;
a fourth, non-planar, connector surface extending between the first and third surfaces and including a second edge, shared with the first surface and parallel to the first plane, and a third edge, shared with the third surface and parallel to the second plane;
the third surface first edge having an axial height greater than the first thickness when measured from the second surface.

16. The clutch plate of claim 15 further comprising a wet friction material affixed to the first and third surfaces.

17. The clutch plate of claim 15 wherein:
the clutch plate further comprises:
a fifth surface, parallel to and offset from the third surface by a second thickness; and,
the third and fifth surfaces are rotated relative to the first surface about an axis tangent to a circle with a center point on the central axis and passing through a point midway between the third and fifth surfaces.

* * * * *